Figure 5:
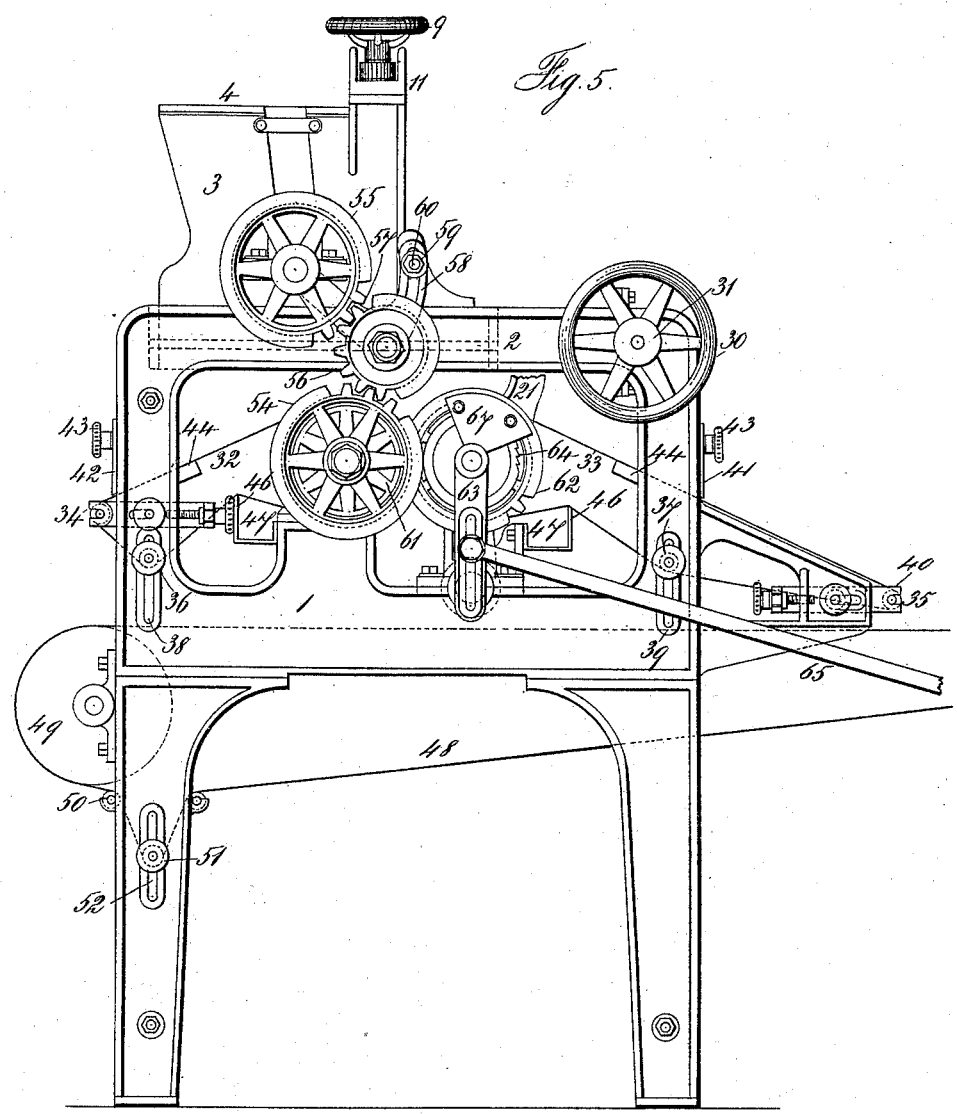

(No Model.)  4 Sheets—Sheet 1.
J. H. MITCHELL.
DOUGH MACHINE.
No. 489,973.  Patented Jan. 17, 1893.
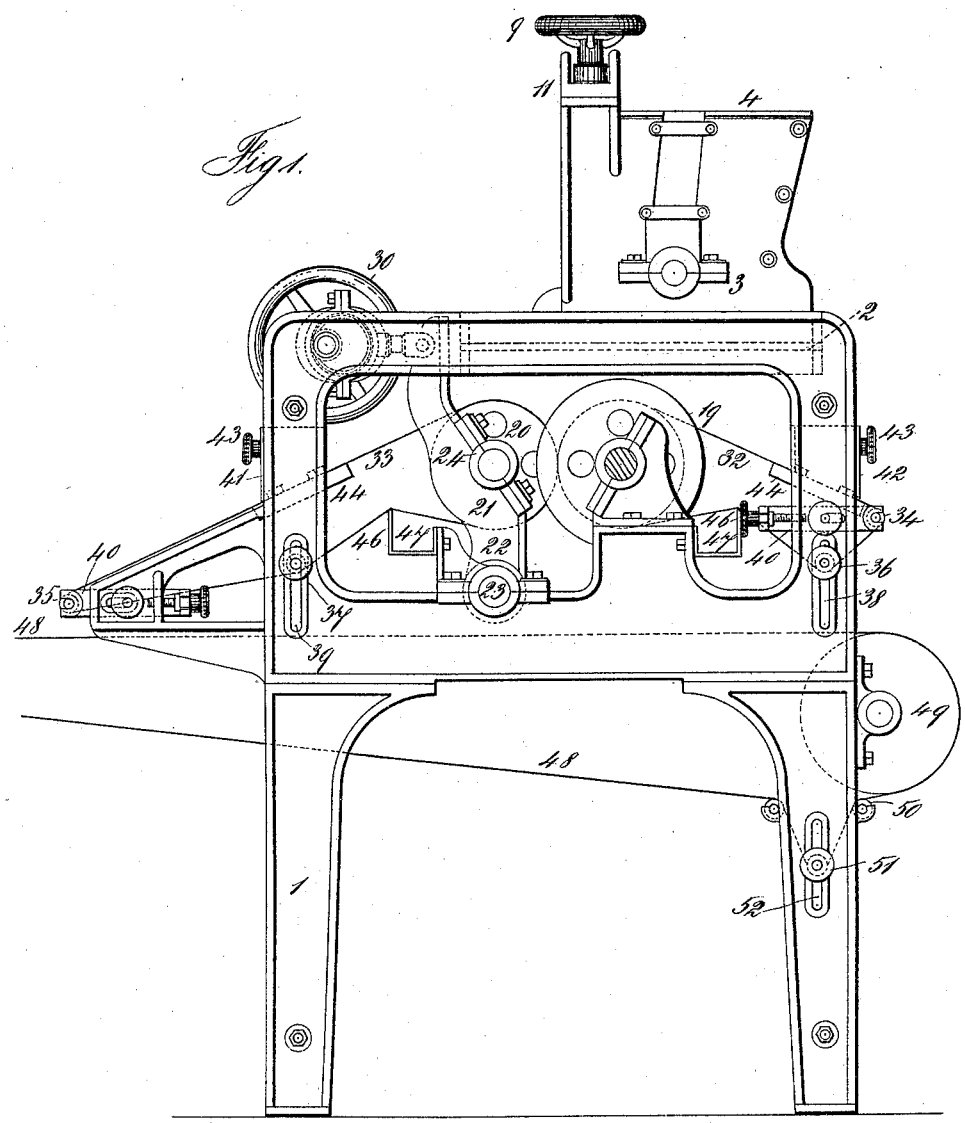
WITNESSES:
John Buckler
Isabel Chester
INVENTOR
J. H. Mitchell,
BY A. M. Pierce,
ATTORNEY

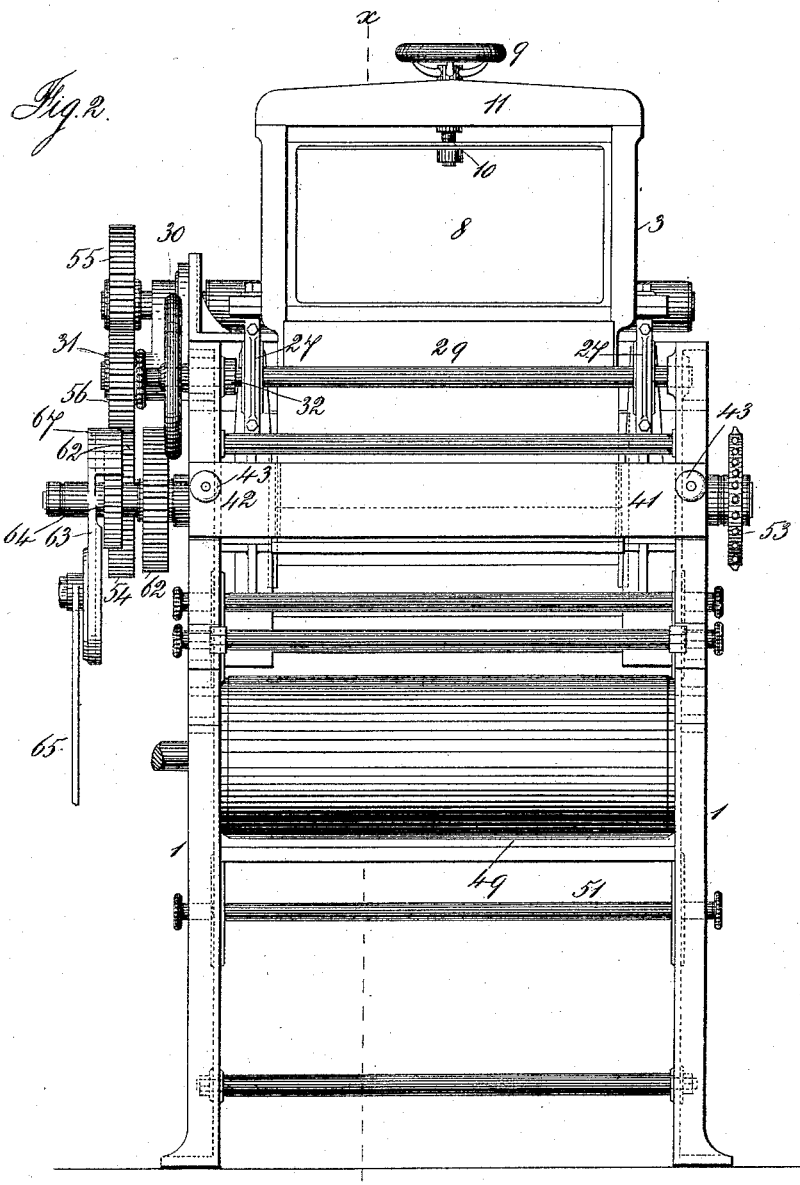

(No Model.) 4 Sheets—Sheet 3.
J. H. MITCHELL.
DOUGH MACHINE.
No. 489,973. Patented Jan. 17, 1893.
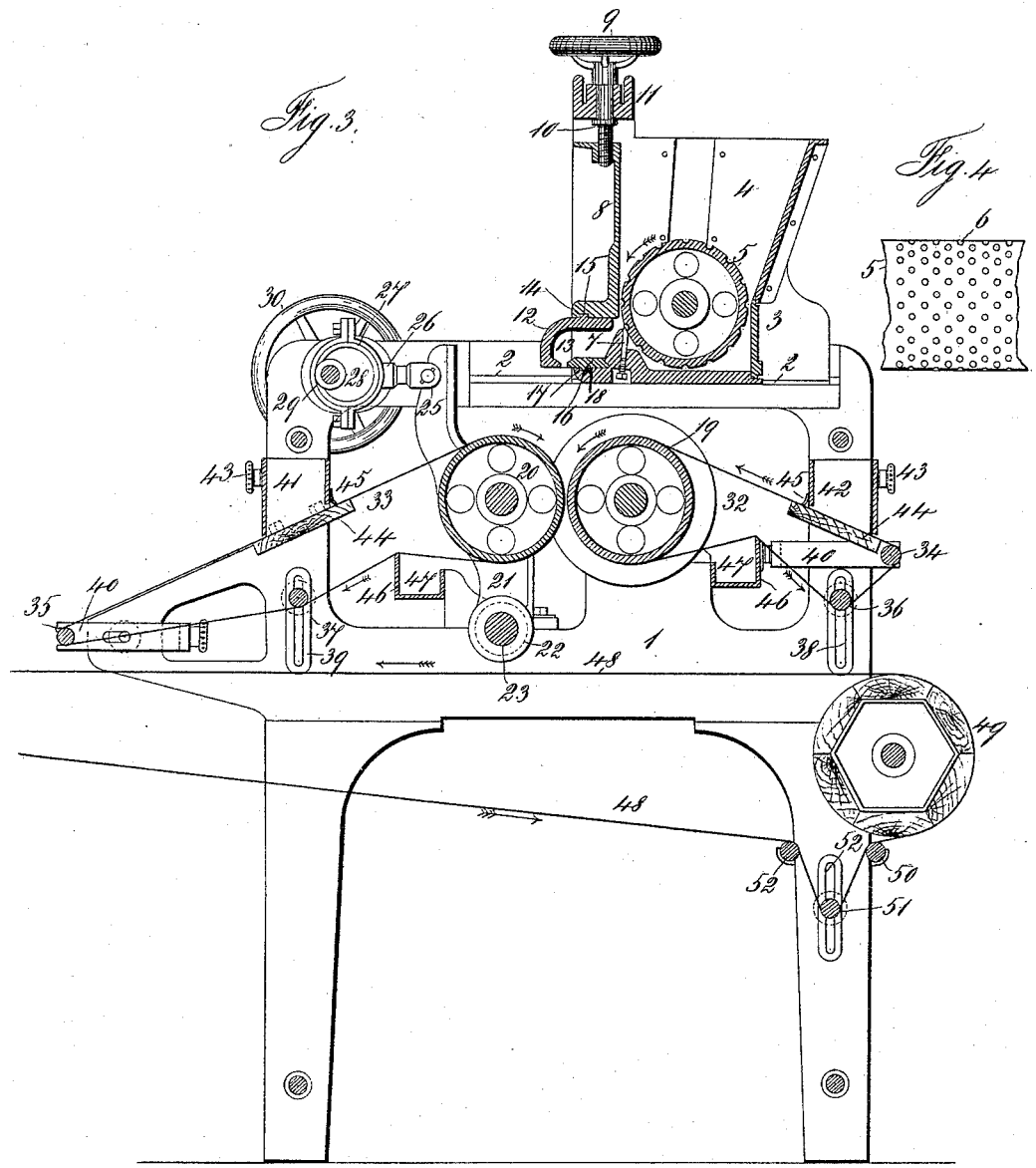
WITNESSES:
John Buckler
Isabel Chester
INVENTOR
J. H. Mitchell
BY A. M. Pierce
ATTORNEY (No Model.) 4 Sheets—Sheet 4.

J. H. MITCHELL.
DOUGH MACHINE.

No. 489,973. Patented Jan. 17, 1893.

WITNESSES:
John Buckler,
Isabel Chester.

INVENTOR
J. H. Mitchell,
BY A. M. Pierce,
ATTORNEY

UNITED STATES PATENT OFFICE.

JAMES HENRY MITCHELL, OF PHILADELPHIA, PENNSYLVANIA.

DOUGH-MACHINE.

SPECIFICATION forming part of Letters Patent No. 489,973, dated January 17, 1893.

Application filed March 15, 1892. Serial No. 424,968. (No model.)

*To all whom it may concern:*

Be it known that I, JAMES HENRY MITCHELL, a citizen of the United States, residing at Philadelphia, in the county of Philadelphia and State of Pennsylvania, have invented a new and useful Improvement in Dough-Machines, of which the following is a specification.

My invention relates especially to mechanism employed by bakers for sheeting dough, and working bars for cracker or cake machines, and has for its object the provision of a simple and effective device which may be readily applied to or used in connection with cracker and cake machines now in use and upon the market.

To attain the desired end, my invention consists essentially in certain novel and useful combinations or arrangements of parts, and peculiarities of construction and operation, all of which will be hereinafter first fully described, and then pointed out in the claims.

In the accompanying drawings, Figure 1 is a side elevation of my continuous dough sheeting and bar working machine. Fig. 2 is an end elevation looking from the left of Fig. 1. Fig. 3 is a vertical, longitudinal sectional view at line x—x of Fig. 2. Fig. 4 is a plan view of a portion of the sheeting roll shown in section in Fig. 3. Fig. 5 is a side elevation of the device, opposite to Fig. 1.

Like numerals of reference, wherever they occur, indicate corresponding parts in all the figures.

1 is the main frame of the machine, having grooves or slide-ways 2, in the top rail. Mounted in these slide-ways is the frame 3, of a dough press.

4 is the hopper of the press, and 5 is a forcing roll mounted therein. This roll is provided with depressions or cavities, 6. In practice, the said cavities are made proportionately smaller than I have shown them in the drawings.

7 is an adjustable scraping knife which bears upon the face of the roll 5. The object of this construction is to allow the dough to enter the depressions, and as the roll passes the scraping knife, the dough is cut off, leaving a surface of dough in each cavity to which the dough in the hopper will adhere when that part of the roll is again brought in contact with the dough mass in the hopper.

8 is the movable front of the hopper 4, provided with a manipulating hand wheel 9, mounted upon a screw 10, which passes through a cross-piece 11, and engages with a screw-threaded perforation in the upper portion of the front piece 8.

12 is a removable side piece to the compressing chamber 13, having a tongue 14, fitting into a groove 15 in the bottom of hopper front 8.

16 is a removable bottom piece of the compressing chamber, held in place by a tongue 17, fitting into a groove 18.

As particularly shown in Fig. 3, the outlet for the dough forms from the press is directly over the sheeting rolls 19 and 20, allowing the forms to descend vertically as they pass from the press, between the said sheeting rolls, in the center of the angle formed by the peripheries of the same. The shaft of the roll 19 is mounted in fixed bearings in the main frame 1. The shaft of the roll 20 is mounted in bearings oscillating upon arms 21, pivoted to the main frame at 22 upon a shaft 23. At 25, eccentric rods 26, are pivoted to the arms 21, the straps 27, connected to said arms passing around eccentrics 28, mounted upon a shaft 29, journaled in the main frame.

30 is a manipulating hand wheel mounted upon an end of the shaft 29. By turning the hand wheel 30, the roll 20 may be forced up to, or drawn away from the roll 19, regulating the space between the said rolls, and consequently the thickness of the sheet formed thereby. Again this hand wheel and the mechanism connected therewith are employed for separating the rolls, and bringing the gears mounted upon the shaft of each of the rolls entirely out of mesh, for the purpose hereinafter described. The hand wheel 30 is loosely keyed to the shaft 29 in such a manner as to permit a slight longitudinal movement upon the said shaft, and the outer extremity of the shaft is screw-threaded for the reception of a small wheel 31. The object of this construction is to provide means for clamping the eccentric shaft in any desired position. By loosening the wheel 31, the shaft may be readily turned to the desired point, and when said wheel 31 is screwed home, it will jam the wheel 30 against the bearing of the shaft thereby locking the parts against movement. 32 is a collar fixed on the shaft 29, preventing lateral movement of said shaft in its bearings.

In order to prevent adhesion of the dough forms to the sheeting rolls, I provide carriers, such for instance as carrier-belts 32 and 33, which pass around said rolls, over rollers 34 and 35, as particularly shown in Fig. 3. These carrier belts are kept tight by means of vertically movable rollers 36 and 37, having their bearings adjustably fixed in slots 38 and 39 in the main frame 1. The rollers 34 and 35 are mounted in adjustable supports 40, to provide additional means for adjusting and tightening the carrier belts 32 and 33.

41 and 42 are flouring boxes open at bottom, and adjustably and removably held in the main frame by means of hand wheels or screws 43.

44 are shelves fixed beneath the flour boxes, the carrier belts passing over the top of these shelves, beneath the flour boxes.

To prevent an excess of flour passing from the flour boxes on to the carrier belts, flexible lips 45, are secured to the edge of the said boxes, the pressure of said lips upon the belts being regulated at pleasure by raising or lowering the flour boxes, insuring a uniform and requisite application of flour to the belts, preventing the adhesion of the forms to the sheeting rolls as they pass therebetween.

In order to remove any particles of dough which may adhere to the carrier belts after passing between the sheeting rolls, said carrier belts pass over scrapers 46, placed over or forming part of receptacles 47. These receptacles are open at the ends, and all accumulations therein may be readily pushed out at either side of the machine.

When the entire machine is in operation, the dough sheet as it passes downward from the sheeting rolls, comes in contact with and rests upon the main carrier belt 48. The function of this carrier is to advance the continuous sheet of dough to a cracker or cake machine in the well known manner, my device providing a continuous sheet, from lump dough, thereby saving considerable labor, and dispensing with the manipulation heretofore required.

My machine is placed in the rear of the cracker or cake machine, and the carrier belt 48 is brought in contact with the main carrier belt of the said machine, or if desired, the carrier 48 may form a continuation of the carrier of the cake or cracker machine, in order that the continuous dough sheet may be carried directly to the cutter of the cracker or cake machine. The carrier belt 48 passes around a drum 49, over a roller 50, around a roller 51 having vertically adjustable bearings, moving in slots 52 in the main frame, and then over a roller 52'; the object of this arrangement being to provide means for keeping the carrier belt 48 sufficiently tight.

Power is applied to the machine by means of a sprocket wheel 53, shown in Fig. 2 as mounted upon the extremity of the shaft of the roll 19, the end of the said shaft being broken off in Fig. 1. Upon the opposite end of this shaft is loosely keyed a gear wheel 54, held in position by a nut and washer to enable the operator to apply any diameter of gear wheel necessary for regulating the speed of the dough press. Upon the shaft of the dough press is fixed a gear 55. This wheel meshes with a wheel 56, located upon a stud secured to an adjustable swinging arm 57, mounted loosely upon the shaft of the dough press. This swinging arm 57 is provided with a slotted segment 58.

59 is a nut mounted upon a securing bolt 60 which passes through the slot in the segment, thus providing means for securing the bearing of the gear 56 in any required position, and permit the said gear to mesh with the different sizes of wheels that may be applied to the driving shaft, as above set forth.

61 is a gear wheel mounted upon the driving shaft of roll 19, inside of wheel 54, and 62 is a wheel which meshes with wheel 61; said wheel 62 being mounted upon the shaft of roll 20.

In operating my machine for bar work, the press is brought forward directly over the movable sheeting roll 20, said roll having been previously retracted from roll 19, and the teeth of the wheels 61 and 62 brought out of mesh, as hereinabove described, by means of the arms 21 and eccentric mechanism. This movement will of necessity slacken the carrying belt 33, but the same may be tightened as required by the means provided for this purpose. The flour box 41 is removed. The two sheeting rolls are now entirely independent of each other, and perform different functions. The one mounted in the stationary bearings is idle, so far as the roll is concerned, but its shaft is employed for transmitting power to the dough press roll. The other roll (20) drives the carrier belt 33, for carrying the strips of dough down an incline and depositing the same upon the belt 48, a reverse movement to that indicated by the arrow in Fig. 3 being required. To obtain this movement, a ratchet segment, 67, provided with a slotted arm, 63, is loosely mounted upon the extremity of the shaft of roll 20, a ratchet wheel 64 being secured upon said shaft. 65 is an operating rod, connected to the arm 63 at one extremity, the other being attached to the reciprocating mechanism of the cake or cracker machine which gives the carrier belt its intermittent forward movement. By this arrangement, the bars or strips of dough will be received from the dough press without damage or disarrangement, and conveyed down the inclined carrier belt and deposited therefrom upon the main carrier without danger of displacement when thus redeposited, and from this point the said strips are carried to the cutting mechanism and treated in the well known manner. In arranging the dough press for use in this connection, the form jaws 12 and 16 are removed, and a plate for producing bars replaces them, said plate being held in the grooves 15 and 18.

I do not in this application claim the combination with a dough press, of a preliminary carrier therebeneath converging toward a main feed apron or carrier, and a main feed apron or carrier, the same being the subject of my application Serial No. 434,821 filed May 28, 1892.

Having now fully described my invention, what I claim as new therein, and desire to secure by Letters Patent, is:

1. In a machine of the character herein specified, the combination with a dough press, of sheeting rolls directly therebeneath, and a carrier belt beneath the said rolls, substantially as shown and described.

2. In a machine of the character herein specified, the combination with a dough press mounted to move longitudinally in a supporting frame, of a pair of sheeting rolls mounted beneath the dough press, one of said rolls being mounted in fixed bearings, and the other in movable bearings, and a main carrier belt, substantially as shown and described.

3. In a machine of the character herein specified, the combination with a dough press, of a pair of sheeting rolls mounted therebeneath; carrier belts passing over said rolls, and flouring devices having communication with said belts, and a main carrier belt, substantially as shown and described.

4. In a machine of the character herein specified, the combination with a belt or band passing around a sheeting roll, of a scraper over which said band passes, and a receptacle at the side of the scraper, substantially as shown and described.

JAMES HENRY MITCHELL.

Witnesses:
A. M. PIERCE,
ISABEL CHESTER.